(12) United States Patent
Bonta et al.

(10) Patent No.: US 8,208,373 B2
(45) Date of Patent: Jun. 26, 2012

(54) METHOD FOR MULTI-BAND COMMUNICATION ROUTING WITHIN A WIRELESS COMMUNICATION SYSTEM

(75) Inventors: Jeffrey D. Bonta, Arlington Heights, IL (US); Ramy S. Ayoub, Arlington Heights, IL (US); Gregory J. Buchwald, Crystal Lake, IL (US); Mario F. Derango, Cary, IL (US); Randy L. Ekl, Lake Zurich, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 794 days.

(21) Appl. No.: 12/183,744

(22) Filed: Jul. 31, 2008

(65) Prior Publication Data

US 2010/0027517 A1 Feb. 4, 2010

(51) Int. Cl.
*H04J 1/00* (2006.01)
(52) U.S. Cl. ............... 370/228; 370/252; 370/254
(58) Field of Classification Search .......... 370/216–228, 370/229–235, 252–258, 328–334, 338
See application file for complete search history.

(56) References Cited

U.S. PATENT DOCUMENTS

| | | | | |
|---|---|---|---|---|
| 2006/0046737 | A1* | 3/2006 | Douglas et al. | 455/452.2 |
| 2006/0285579 | A1* | 12/2006 | Rhee et al. | 375/132 |
| 2008/0095058 | A1* | 4/2008 | Dalmases et al. | 370/237 |
| 2009/0047916 | A1* | 2/2009 | Haykin | 455/115.1 |

OTHER PUBLICATIONS

Pradeep Kyasanur, Nitin H. Vaidya—"Protolcol Design Challenges for Multi-hop dynamic Spectrum Access Networks"—IEEE 2005—pp. 645-648.
Charles E. Perkins, Elizabeth M. Royer and Samir R. Das—"Quality of Service for Ad hoc On-Demand Distance Vector Routing"—Mobile Ad Hoc Networking Working Group—Jul. 2000—9 pages.
Richard Draves, Jitendra Padhye and Brian Zill—Routing in Multi-Radio, Multi-Hop Wireless Mesh Networks—MobiCom 2004—15 pages.

* cited by examiner

*Primary Examiner* — Pao Sinkantarakorn
(74) *Attorney, Agent, or Firm* — Randi L. Karpinia

(57) ABSTRACT

A method of operation of a node for multi-band communication routing within a wireless communication system comprises communicating a communication session on a default route within an identified quality of service objective on a first frequency band; broadcasting, on a second frequency band, one or more route discovery messages at each of a plurality of sets of transmission variables; storing one or more alternate route table entries in a route table, wherein each of the one or more alternate route table entries are indexed by each of the plurality of sets of transmission variables that are at least within the quality of service objective; selecting a stored alternate route that is at least within the quality of service objective of the communication session on the second frequency band; and switching the communication session to operate using the transmission variables related to the selected alternate route.

11 Claims, 6 Drawing Sheets

METHOD FOR MULTI-BAND COMMUNICATION ROUTING WITHIN A WIRELESS COMMUNICATION SYSTEM

FIELD OF THE DISCLOSURE

The present disclosure relates generally to wireless communication systems and more particularly to routing over multiple frequency bands within a wireless communication system.

BACKGROUND

The demand for wireless communications continues to rise. Broadband services are stretching the limits of spectrum. The Federal Communications Commission (FCC) has issued a notice of proposed rulemaking (NPRM) encouraging cognitive radio technology as a candidate to implement negotiated or opportunistic spectrum sharing.

Cognitive radio technology is an enhancement on traditional software radio design in which observations of the operating environment are combined with knowledge of the radio's available hardware and software capabilities to form decisions as to how to modify the radio's behavior to produce a desired level of performance.

Cognitive radio technology includes the capability of mobile nodes to alter transmission parameters based on knowledge of its environment. For example, a cognitive radio network can be a network of mobile communication nodes (hereinafter referred as nodes) in which a mobile communication node changes its transmission or reception parameters to communicate efficiently in order to avoid interference with incumbent users. This alteration of parameters is based on active monitoring of several factors in the external and internal radio environment, such as radio frequency spectrum, user behavior and network state.

Since current wide area networks such as cellular networks cannot meet projected demands, there is a need to create alternative wide area networks. Ad hoc is a promising networking technology that is targeted toward unlicensed spectrum.

Ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly, techniques are needed which can allow the ad hoc network to dynamically adjust to these changes. In ad hoc networks which lack a central controller, many network-controlling functions can be distributed among the nodes such that the nodes can self-organize and reconfigure in response to topology changes.

One characteristic of ad hoc network nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination. For relaying packets to the next node, each node maintains routing information collected through conversation with its neighboring nodes. The routing information can also be periodically broadcast in the network to reflect the current network topology. Alternatively, to reduce the amount of information transmitted for maintaining accurate routing information, the network nodes may exchange routing information only when it is needed.

With this FCC ruling, cognitive technology coupled with ad hoc technology provides almost unlimited spectrum availability. With this coupling of technologies applied toward the creation of a wide area network solution, a significant problem is determining how to make this new wide area network solution as reliable as incumbent systems operating strictly within licensed spectrum. The first step toward solving this problem is overcoming propagation distances at difference frequencies. In a system with mobility, ad hoc networks must provide mechanisms to maintain alternate paths or routes between nodes of the network in order to maximize the reliability of the network.

Accordingly, there is a need for a method to enable traffic to be maintained over multiple hops of an ad hoc network when the alternate paths may reside on different frequency bands with different propagation characteristics.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
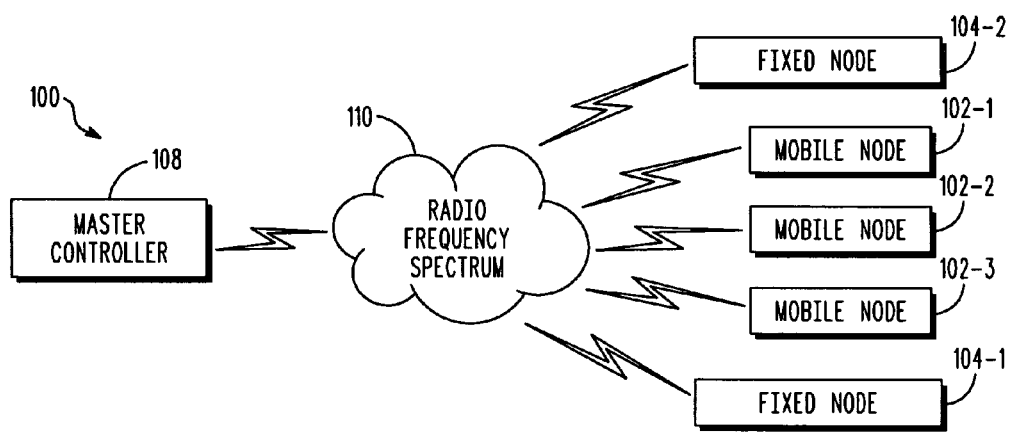
FIG. 1 is a block diagram illustrating a mobile ad hoc cognitive network in which various embodiments of the invention may function.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method of operation of a node for multi-band communication routing within a wireless communication system comprises: communicating a communication session on a default route within an identified quality of service objective on a first frequency band; broadcasting, on a second frequency band, one or more route discovery messages at each of a plurality of sets of transmission variables; storing one or more alternate route table entries in a route table, wherein each of the one or more alternate route table entries are indexed by each of the plurality of sets of transmission variables that are at least within the quality of service objective; selecting a stored alternate route that is at least within the quality of service objective of the communication session on the second frequency band; and switching the communication session to operate using the transmission variables related to the selected alternate route.

FIG. 1 is a block diagram illustrating a mobile ad hoc cognitive network 100 in which various embodiments of the invention may function. The mobile ad hoc cognitive network 100, for example, can comprise an ad hoc wireless communication network 100 such as a mesh enabled architecture (MEA) network or an 802.11 network (i.e. 802.11a, 802.11b, 802.11g, 802.11n or 802.11s). (For these and any IEEE standards recited herein, see: http://standards.ieee.org/get-ieee802/index.html or contact the IEEE at IEEE, 445 Hoes Lane, PO Box 1331, Piscataway, N.J. 08855-1331, USA.) It will be appreciated by those of ordinary skill in the art that the mobile ad hoc cognitive network 100 in accordance with the present invention can alternatively comprise any packetized communication network where packets are forwarded across multiple wireless hops. For example, the mobile ad hoc cognitive network 100 can be a network utilizing multiple access schemes such as OFDMA (orthogonal frequency division multiple access), TDMA (time division multiple access), FDMA (Frequency Division Multiple Access), or CSMA (Carrier Sense Multiple Access). Additionally, each wireless hop of the mobile ad hoc cognitive network 100 may either employ the same multiple access scheme as the other hops, or a unique multiple access scheme per hop, or alternatively a different access scheme can be used in each direction of a hop.

The mobile ad hoc cognitive network 100 includes a plurality of mobile nodes 102-n and can optionally include one or more fixed nodes 104-n. Each of the fixed nodes 104-n, for example, can be an access point or intelligent access point. Each of the mobile nodes 102-n and each of the fixed nodes 104-n may be a cognitive radio, a wireless device, a mobile station, a user equipment, or any similar device that can transmit and receive signals. Also, each mobile node 102-n and each fixed node 104-n are configured to operate according to any of a number of different communication technologies including, but not limited to, second generation (2G), third generation (3G) and fourth generation (4G) wireless communication technologies, Global System for Mobile Communication (GSM), Code Division for Multiple Access (CDMA), Universal Mobile Telecommunication System (UMTS), Wideband Code Division for Multiple Access (W-CDMA), Orthogonal Frequency Division Multiplexing (OFDM), Worldwide Interoperability for Microwave Access (WiMax), Long-Term Evolution (LTE) and other communication technologies.

As can be appreciated by one skilled in the art, the nodes 102 and 104 are capable of communicating with each other directly or indirectly. When communicating indirectly, one or more other nodes can operate as a router or routers for forwarding or relaying packets being sent between nodes.

The mobile ad hoc cognitive network 100 may also optionally include a master controller 108. The master controller 108 may be any user device, infrastructure device, access point, base station, cognitive radio, or any similar device that can negotiate with at least one other user device in the communication system 100. The master controller 108, for example, can provide access to the radio frequency spectrum 110 to one or more of the plurality of mobile nodes 102-n and/or one or more of the plurality of fixed nodes 104-n by authorizing or licensing such use.

Each mobile node 102-n and each fixed node 104-n uses a radio frequency spectrum 110 to initiate communication with other nodes and the master controller 108. The radio frequency spectrum 110 acts as a communication media to provide communication to the mobile nodes 102-n and the fixed nodes 104-n. In general, the spectrum is a band of frequencies that is divided into a plurality of sub-band of frequencies known as frequency channels or frequency bands. For the purposes of this application, a group of frequency channels are also referred to as spectrum. It will be appreciated that authorization and control of the use of the radio frequency spectrum 110 can be centralized through the master controller 108 or alternatively can be distributed among a plurality of the mobile nodes 102-n and/or a plurality of the fixed nodes 104-n.

Figure 2:
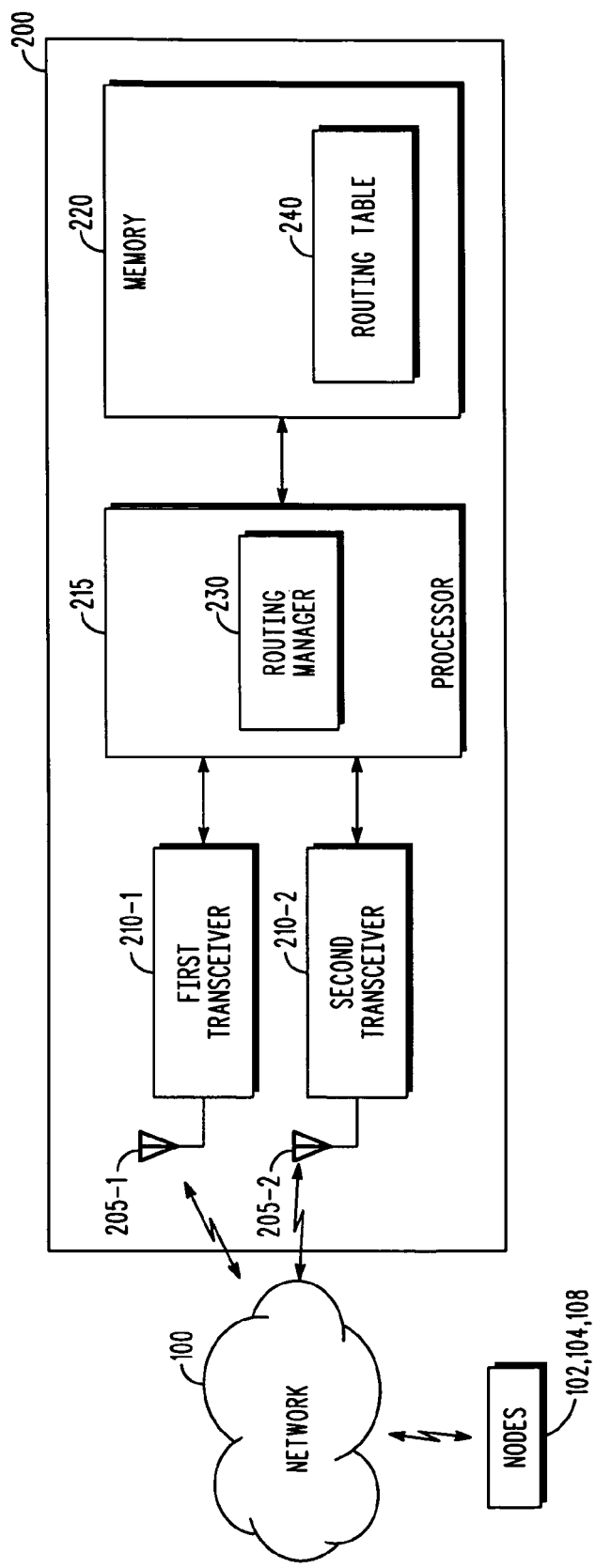
FIG. 2 is an electronic block diagram of an example node for operation within the mobile ad hoc cognitive network of FIG. 1 in accordance with some embodiments.

FIG. 2 is an electronic block diagram of one embodiment of a node 200 in accordance with the present invention. The node 200, for example, can exemplify one or more of the nodes 102-n and 104-n of FIG. 1. As illustrated, the node 200 includes an antenna 205, one or more transceivers (or modem) 210-n, a processor 215, and a memory 220.

The node 200, for example, can be an integrated unit containing at least all the elements depicted in FIG. 2, as well as any other elements necessary for the mobile node 200 to perform its particular functions. Alternatively, the node 200 can comprise a collection of appropriately interconnected units or devices, wherein such units or devices perform functions that are equivalent to the functions performed by the elements of the node 200. For example, the node 200 may comprise a laptop computer coupled to a wireless local area network (WLAN) card.

Each antenna 205-n intercepts transmitted signals from one or more nodes 102, 104, or the master controller 108 within the mobile ad hoc cognitive network 100 and transmits signals to the one or more nodes 102, 104, 108 within the mobile ad hoc cognitive network 100. Each antenna 205-n is coupled to an associated transceiver 210-n, which employs conventional demodulation techniques for receiving and transmitting communication signals, such as packetized signals, to and from the node 200 under the control of the processor 215. For example, a first antenna 205-1 is communicatively coupled to a first transceiver 210-1; and a second antenna 205-2 is communicatively coupled to a second transceiver 210-2. Each of the antenna 205 and associated transceiver 210 pairs, for example, can operate on a particular frequency band. It will be appreciated by those of ordinary skill in the art that any number of transceivers 210 and associated antennas 205 can be implemented within the node 200 including one transceiver or alternatively more than two transceivers. The packetized data signals can include, for example, voice, data or multimedia information, and packetized control signals, including node update information. When the transceiver 210 receives a command from the processor 215, the transceiver 210 sends a signal via the antenna 205 to one or more devices within the mobile ad hoc cognitive network 100. In an alternative embodiment (not shown), the node 200 includes a receive antenna and a receiver for receiving signals from the communication network 100 and a transmit antenna and a transmitter for transmitting signals to the communication network 100. It will be appreciated by one of ordinary skill in the art that other similar electronic block diagrams of the same or alternate type can be utilized for the node 200. The transceiver 210 coupled to the antenna 205 operates over an ad hoc networking air interface (e.g., Bluetooth, 802.11 networking, 802.16 or 802.16e WiMAX (Worldwide Interoperability for Microwave Access), and the like).

In accordance with some embodiments, the transceiver 210 can be a cognitive transceiver. A cognitive transceiver can intelligently detect which communication channels are in use and which are not, and instantly move into vacant channels while avoiding occupied ones. This optimizes the use of available radio-frequency (RF) spectrum while minimizing interference to other users. The cognitive transceiver can further determine its geographic location, identify and authorize its user, encrypt or decrypt signals, sense neighboring wireless devices in operation, and adjust output power and modulation characteristics.

The implementation of the transceiver 210 depends on the implementation of the mobile node 200. For example, the transceiver 210 can be implemented as an appropriate wireless modem, or as conventional transmitting and receiving components of two-way wireless communication devices. In the event that the transceiver 210 is implemented as a wireless modem, the modem can be internal to the node 200 or insertable into the node 200 (e.g., embodied in a wireless radio frequency (RF) modem implemented on a Personal Computer Memory Card International Association (PCMCIA) card). For a wireless communication device, the transceiver 210 can be implemented as part of the wireless device hardware and software architecture in accordance with known techniques. Most, if not all, of the functions of the transceiver 210 can be implemented in a processor, such as the processor 215. However, the processor 215 and the transceiver 210 have been artificially partitioned herein to facilitate a better understanding.

Coupled to the transceiver 210, is the processor 215 utilizing conventional signal-processing techniques for processing received messages. It will be appreciated by one of ordinary skill in the art that additional processors can be utilized as required to handle the processing requirements of the processor 215.

In accordance with the present invention, the processor 215 includes a routing manager 230 for managing a default route and various alternative routes to each of a plurality of destinations within the mobile ad hoc cognitive network 100. It will be appreciated by those of ordinary skill in the art that the routing manager 230 can be hard coded or programmed into the node 200 during manufacturing, can be programmed over-the-air upon customer subscription, or can be a downloadable application. It will be appreciated that other programming methods can be utilized for programming the routing manager 230 into the node 200. It will be further appreciated by one of ordinary skill in the art that the routing manager 230 can be hardware circuitry within the node 200. In accordance with the present invention, the routing manager 230 can be contained within the processor 215 as illustrated, or alternatively can be an individual block operatively coupled to the processor 215 (not shown).

To perform the necessary functions of the node 200, the processor 215 is coupled to the memory 220, which preferably includes a random access memory (RAM), a read-only memory (ROM), an electrically erasable programmable read-only only memory (EEPROM), and flash memory. The memory 220, in accordance with the present invention, includes a storage location for the storage of a routing table 240.

It will be appreciated by those of ordinary skill in the art that the memory 220 can be integrated within the node 200, or alternatively, can be at least partially contained within an external memory such as a memory storage device. The memory storage device, for example, can be a subscriber identification module (SIM) card. A SIM card is an electronic device typically including a microprocessor unit and a memory suitable for encapsulating within a small flexible plastic card. The SIM card additionally includes some form of interface for communicating with the node 200.

Figure 3:
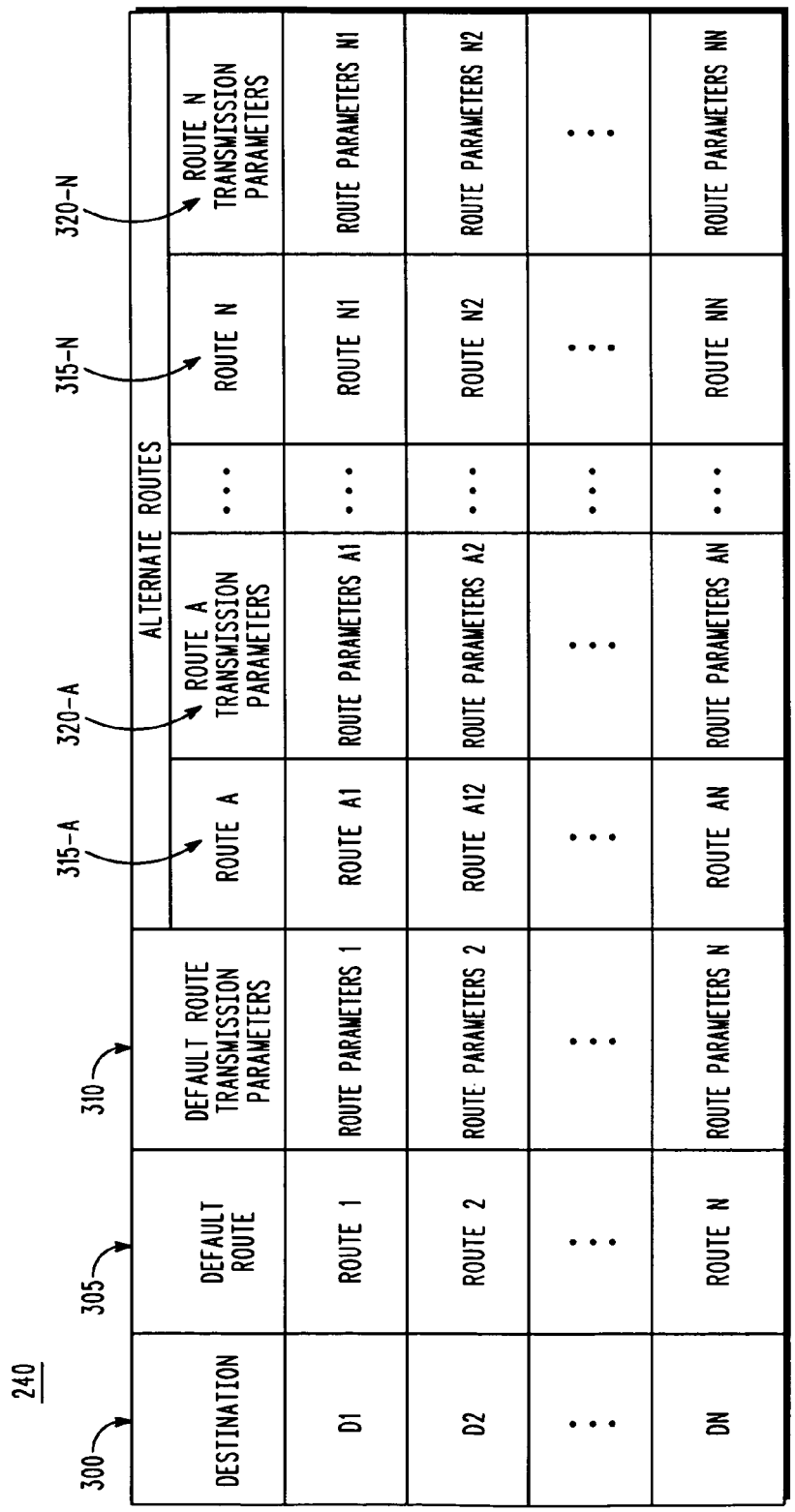
FIG. 3 is an example layout of a routing table maintained at the node of FIG. 2 in accordance with some embodiments.

A layout of the routing table 240 maintained at the node 200 in accordance with some embodiments is illustrated in FIG. 3. As illustrated in FIG. 3, the node 200 stores in the routing table 240, for each destination 300, a default route 305, one or more transmission parameters 310 of the default route (such as, for example, the channel frequency band, the modulation type, the coding rate, the spreading factor, and the transmit (Tx) power), and one or more alternate routes 315 and the associated transmission parameters 320 (such as, for example, the channel frequency band, the modulation type, the coding rate, the spreading factor, and the Tx power), for each of the alternate routes 315.

The routing manager 230 is programmed to utilize a unique routing protocol for establishing and maintaining communication between the node 200 and the various destination nodes 300. Since each frequency band has different propagation characteristics, the route discovery and route maintenance procedure proactively normalizes the candidate alternate routes between the node 200 and each destination 300. To accomplish this, the routing manager 230 utilizes the transmission variables for each of the default routes 305 and alternate routes 315 to enable the selection of alternate routes across multiple frequency bands with the assurance that the alternate route selected will be capable of maintaining the same quality of service (QoS) as the initial route. Routes may be dedicated to one frequency band or they may support multiple hops through different frequency bands. Initial route discovery utilizes the various transmission parameters 310 and 320-$n$ including the channel frequency (e.g. 5 Gigahertz (GHz) Industrial, Scientific and Medical (ISM) radio band, 2.4 GHz band, 4.9 GHz public safety band, 400-700 Megahertz (MHz) television (TV) band, etc.), the modulation type (e.g. Binary Phase Shift Keying (BPSK), quadrature phase-shift keying (QPSK), 8PSK, 16 QAM (Quadrature amplitude modulation), 32QAM, 64QAM, etc.), the coding rate (e.g. ½ rate, ¾ rate, ⅓ rate, etc.), the spreading factor, and the Transmit (Tx) power to be transmission variables in the route discovery assessment.

In one embodiment, at least two nodes are available to enable route discovery and maintenance with these transmission variables.

Figure 4:
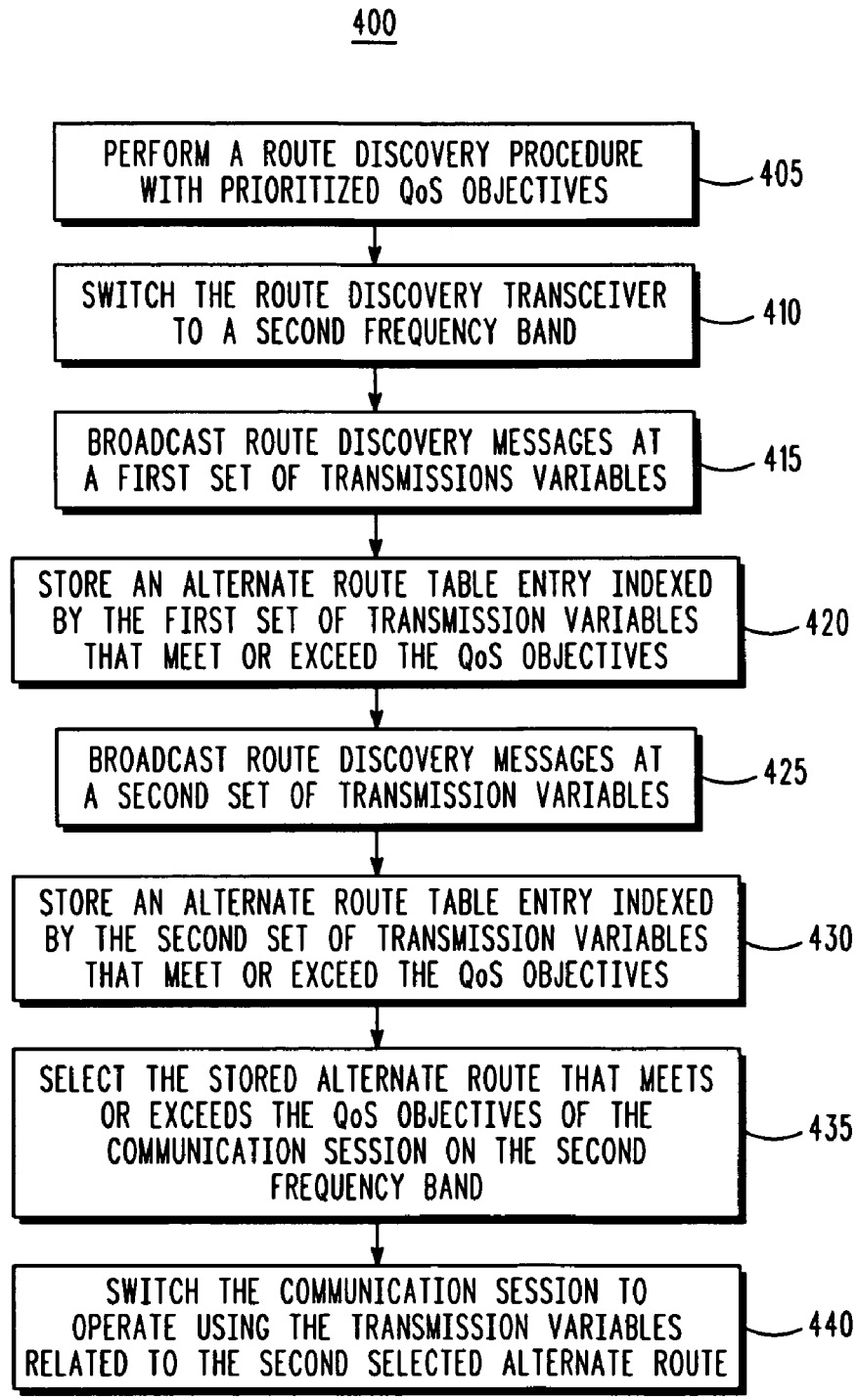
FIGS. 4 and 5 are flowcharts illustrating various operations of the node of FIG. 2 in managing a route from the node to a destination in accordance with some embodiments.

FIG. 4 is a flowchart illustrating the operation 400 of the node in managing a route from the node 200 to a destination. It will be appreciated that the operation 400 can be performed, for example, by the routing manager 230 of the node 200. As illustrated, the operation 400 begins with Step 405 in which the node performs a route discovery procedure with prioritized QoS objectives. Next, in Step 410, the routing manager 230 switches the route discovery transceiver to a second frequency band. Next, in Step 415, the node broadcasts route discovery messages at a first set of transmission variables.

Next, in Step 420, the node stores an alternate route table entry indexed by the first set of transmission variables that meet or exceed the QoS objectives with a safety margin. Next, in Step 425, the node broadcasts route discovery messages at a second set of transmission variables. Next, in Step 430, the node stores an alternate route table entry indexed by the second set of transmission variables that meet or exceed the QoS objectives with a safety margin. It will be appreciated by one of ordinary skill in the art that Step 430 can be repeated for a plurality of alternate route table entries. Next, in Step 435, the node selects the stored alternate route that meets or exceeds the QoS objectives of the communication session on the second frequency band. Next, the node switches the communication session to operate using the transmission variables related to the selected alternate route.

Figure 5:
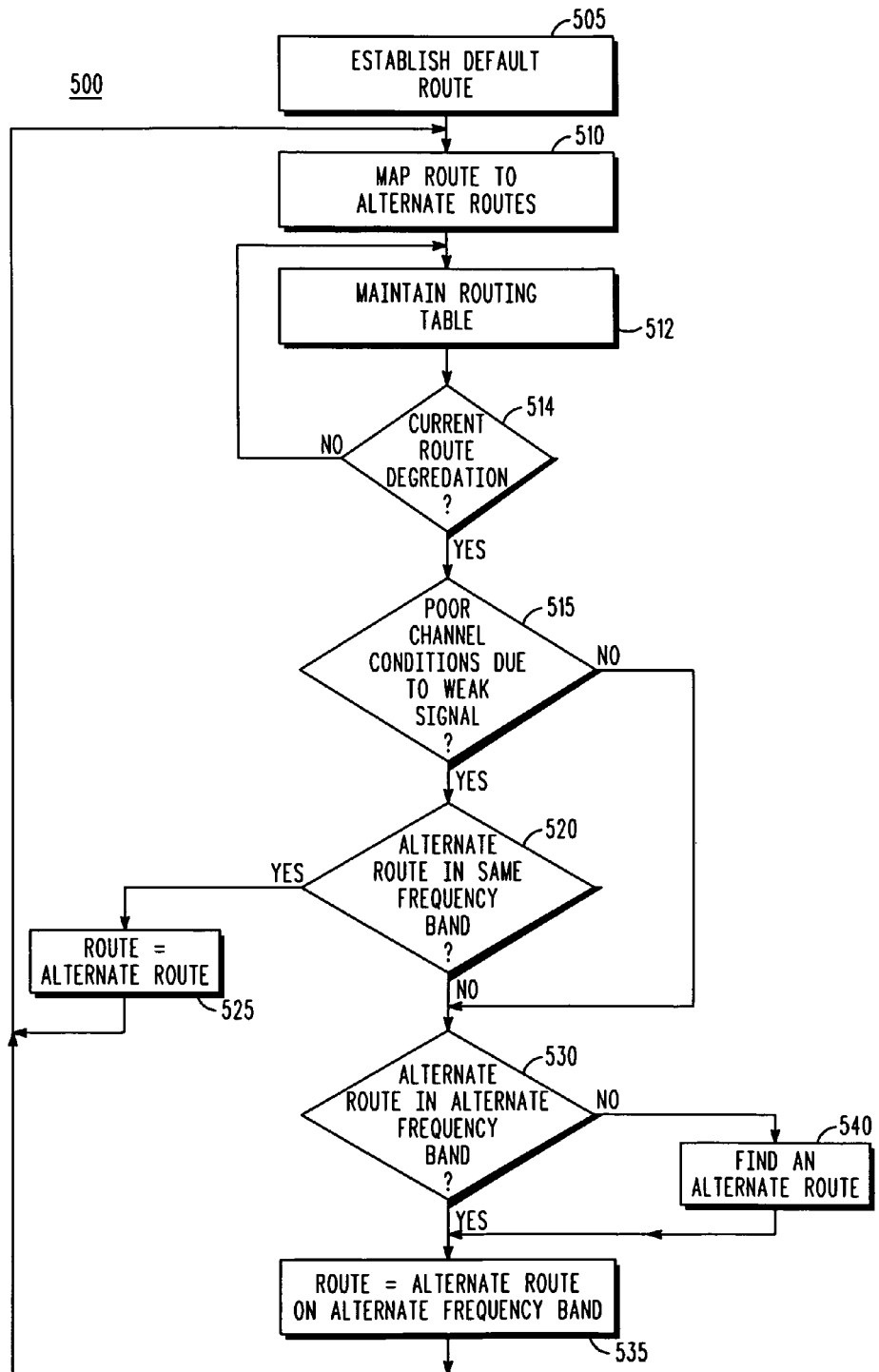

FIG. 5 is a flowchart illustrating further detail of the operation 500 of the node 200 in managing routes to each destination 300. In Step 504, a default route 305 is established using the highest frequency band and the lowest power to enable the communication session to meet its QoS objectives in terms of data rate and latency. Next, in Step 510, for each combination of the above mentioned transmission variables that are used in route discovery, a route table entry is created that allows the default route 305 to the next node in the default frequency band to be mapped to alternate routes 315 using an alternate frequency band. The mapping of the default route 305 to the alternate route 315 allows the propagation distances of the lower frequency bands to be normalized to the default route with the appropriate transmission variable selection of modulation type, coding rate, spreading factor, and Tx power. In an alternate embodiment, the default route could be established using the lowest frequency band.

Next, in Step 512, the routing table is maintained at the node. Next, in Step 514, it is determined whether or not the current route has begun to degrade. When no degradation is identified, the operation cycles back to Step 512 to continue to maintain the routing table. When a degradation is identified in Step 514, the operation continues to Step 515.

There are a various scenarios resulting from a changing environment which can cause the degradation identified in Step 514, thereby precipitating a change in the established route to an alternate route. When a node is experiencing poor channel conditions, it will first determine the nature of the poor channel conditions. In Step 515, the node determines if the channel conditions are strictly related to a weak signal from the neighboring node. When the poor channel conditions are due to a weak signal, the process continues to Step 520 in which the node determines whether there is an alternate route in the same frequency band. When there is an alternate route in the same frequency band, the process continues to Step 525 in which a new route to an alternate neighbor is selected. The process then cycles back to Step 510.

However, when the poor channel conditions are a function of interference or when there is not an alternate path in the same frequency band, then the process continues to Step 530 in which the node determines if an alternate route in an alternate frequency band has already been stored in the routing table. Since the propagation characteristics may differ on an alternate frequency band, the node provides its QoS objectives (e.g. a required data rate) to the route selection algorithm along with the desired destination. The route selection algorithm will then try to match the QoS objectives to the possible routes to the desired destination. When a route is known that meets the QoS objectives, then the route and the stored transmission variables associated with this route are returned so that the node can initiate a route change on the alternate frequency band in Step 535. The process then cycles back to Step 510.

When the node does not have an alternate route in Step 530, the process continues to Step 540, in which the node utilizes its cognitive transceiver to find an alternate route on a different frequency that is likely to have different propagation characteristics. Thereafter, the process proceeds to Step 535 as previously discussed.

The cognitive radio has at its disposal a variety of transmission variables that can be adjusted to find a route that meets or exceeds the QoS objectives of the call. The cognitive radio will adjust those transmission variables to find alternate routes that meet or exceed the QoS objectives (e.g. a required data rate). For example, as the interference level increases in the frequency band of the default route, there is a need to switch to an alternate band to avoid the interference. In one example scenario, the alternate routes toward the destination are sought in a lower frequency band.

Figure 6:
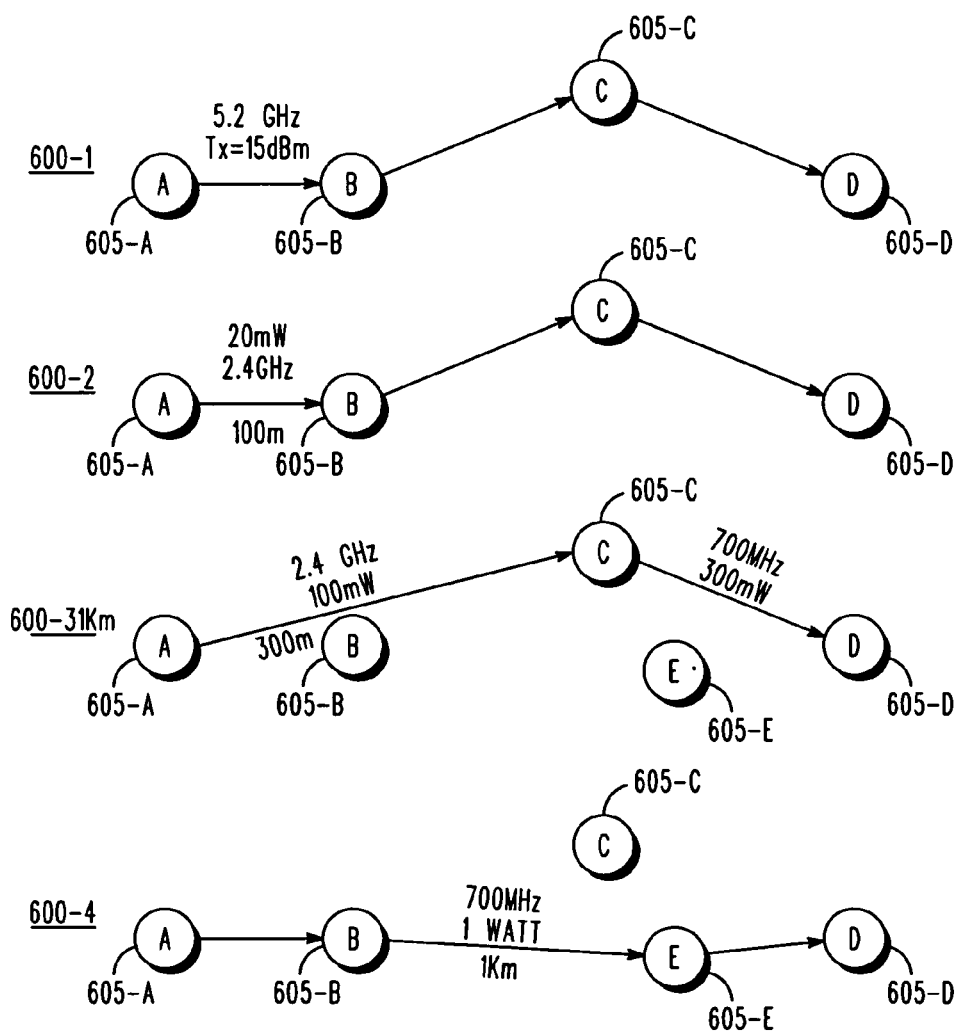
FIG. 6 illustrates various routes for communicating between a source node and a destination node in accordance with some embodiments.

FIG. 6 illustrates various routes 600-1, 600-2, 600-3, and 600-4 from a source node 605-A to a destination node 605-D. Suppose that the default route 600-1 was established in the 5.2 GHz frequency band with a 30 mW transmit power. The desired QoS requires a data rate of one (1) Mega bit per second (Mbps). Prior to the expressed need to find an alternate route to the destination in a different frequency band, the second transceiver is assigned to searching for an alternate route toward the destination in the 2.4 GHz frequency band with a specified QoS in the preferred embodiment. In an alternate embodiment, for those devices with only one transceiver, they can cognitively leave the current channel and search on the alternate channel, as long as the device or system ensures that the device does not miss any critical communications. In this case, the cognitive radio is the same transceiver as the one used to support the current connection.

Continuing with the example and the embodiment of two transceivers, an alternate route is desired to enable the established communication session to maintain the desired QoS of 1 Mbps. Since the lower frequency band is characterized as having better propagation, it is also desired to take advantage of the switch to an alternate route so that the switch will enable a route to be selected with lesser hops toward the destination. In essence, the switch to a lower frequency band could enable the previously used next hop to be "leaped over" in favor of a node at a greater distance away that reduces the total number of hops to the destination.

To accomplish this, the QoS objectives are sent to the route discovery procedure. Route requests to the destination node are first broadcast by the second transceiver with the transmission variables set at the lowest transmit power, the highest modulation type, highest coding rate, and lowest spreading factor to find routes offering the highest data rate that exceeds the current communications QoS objectives regardless of range and number of hops needed to reach the destination. As illustrated in FIG. 6, route 600-2 is identified in the 2.4 GHz frequency range using the same node routing as in route 600-1. Using route 600-2, improved propagation characteristics of the 2.4 GHz frequency band permits the transmit power to be reduced to 20 mW between nodes 605-A and 605-B. Alternatively, route 600-3 is identified in which node 605-B can be eliminated, thereby reducing the number of required hops. This is made possible by increasing the transmit power to 100 mW on the hop between nodes 605-A and 605-C. Lastly, route 600-4 is identified using a more direct path geographically. Here, the 700 MHz frequency band enables node 605-C to be eliminated while communicating 1 km between nodes 605-B and 605-E. This is made possible because the 700 MHz frequency band permits the higher transmit power of 1 watt. As each route is found, a route table entry is created toward the destination that is indexed by a combination of the destination address and the transmission variables (i.e. frequency band, modulation type, coding rate, spreading factor, and Tx power) that enable those QoS objectives to be met or exceeded and the route entry has performance metrics that are possible with those transmission variables (e.g. a certain data rate, a certain hop count, a cumulative link quality, etc.). With this information in the route entries, the node that is experiencing poor channel conditions can select a route that meets or exceeds the QoS objective of the call.

A possible outcome of a new route is that the hop count can improve due to improved propagation characteristics, but this is not a guarantee and is dependant on network topology. In order to increase the alternate route options, the modulation type, coding rate, spreading factor, and Tx power are varied in order to find routes with the smallest number of hops (or the highest quality metric) to the destination while still maintaining the desired QoS of 1 Mbps. Note that all combinations need not be experimentally determined, only the contour of the acceptable cases. Again, as each route is found, a route table entry is created toward the destination that is indexed by a combination of the destination address and the transmission variables (i.e. frequency band, modulation type, coding rate, spreading factor, and Tx power). The route that uses the highest Tx Power, lowest modulation type, lowest coding rate, and highest spreading factor at or above 1 Mbps will offer the best range to the next hop toward the destination.

Alternatively, the search for alternate routes could start searching for next hop nodes toward the destination offering the best range and working back toward the route with the highest data rate and lowest range to the next hop. In the end, the route table will contain alternate routes within the 2.4 GHz band that can be selected to meet or exceed the QoS objectives of the communication session which includes reducing the delays or latency by using lesser hops toward the destination. Specifically, when the interference level increases and it is necessary to find an alternate route to the destination, each node will know how to set the modulation type, coding rate, spreading factor, and Tx power when switching to the alternate route on the new frequency band, and the routing algorithm will be able to select the route with the least number of hops.

In a wireless network, the channel conditions change constantly and most radios use adaptive modulation and coding to respond to the channel changes. The before-mentioned procedure can only know which combinations meet the QoS requirements at the time of the measurement, but the route entries cannot guarantee that the radios along the route can sustain the QoS requirements with the selected transmission variables for the route lifetime duration. Therefore, the routing algorithm must be conservative about creating the route entries based on certain transmission variables that barely meet the QoS objectives. To accomplish this, a threshold or margin of safety is associated with each route by evaluating the next more conservative step of certain transmission variables and storing the more conservative step in the routing entry. Additionally, the route entries will have a limited life before the cognitive radio must re-validate the route. The node that is experiencing poor channel conditions may only trigger the cognitive radio to find an alternate route periodically or in one embodiment, only when it is ready to make a change in routes. Finally, if a route is chosen and its channel conditions have changed significantly, the before-mentioned procedure enables identification of other alternate routes that the node can switch to if the QoS objectives cannot be maintained.

When an alternate route is selected in a different frequency band, it may be desirable for all links within the route to the destination to operate on the same frequency band. However, this is not a requirement. If it is acceptable for the route to be maintained over more than one frequency band, then the transmission variables are maintained locally within each node while the QoS objectives are shared between all nodes along the route. However, if it is desired to maintain the route on a common frequency band, then some transmission variables (e.g. frequency band) may need to be shared with the other nodes along the route.

Note that in a reactive routing algorithm such as Ad hoc On-Demand Distance Vector (AODV) Routing, the routing algorithm will have to allow neighbors to process more than one route request (i.e. each neighbor may receive multiple route requests for each possible transmission variable). Alternatively, a probe could be sent for each transmission variable instead of a route request so that the neighbor has no obligation to forward the route request. When the transmission variables are selected that meet the QoS objectives based on responses from the probe, then a route request could be sent.

In another example scenario where changes in the environment (such as interference level) precipitate a switch to an alternate route on a different frequency band, the initial route exists on a lower frequency band and an alternate route is being sought toward the same destination on a higher frequency band. For example, suppose that the initial route was established in the 2.4 GHz frequency band with a 15 dBm transmit power. The required QoS requires a data rate of 1 Mbps. Prior to the expressed need to find an alternate route to the destination in a different frequency band, the second transceiver is assigned to searching for an alternate route toward the destination in the 5.2 GHz frequency band. Since the higher frequency band is characterized as having poorer propagation, it is also necessary to adjust the modulation type, coding rate, spreading factor, and Tx power when switching to the alternate route on the new frequency band so as to maintain the desired QoS of 1 Mbps. Knowing how to set up a connection in advance with a next hop node that is within range will minimize the disruption to service. The appropriate route to the destination must be found. To accomplish this, the procedure is similar to the previous example where the QoS objectives are sent to the route discovery procedure. Route requests to the destination node are first broadcast by the second transceiver with the transmission variables set at the lowest transmit power, the highest modulation type, highest coding rate, and lowest spreading factor to find routes offering the highest data rate that exceeds the current communications QoS objectives regardless of range and number of hops needed to reach the destination. As each route is found, a route table entry is created toward the destination that is indexed by a combination of the destination address and the transmission variables (i.e. frequency band, modulation type, coding rate, spreading factor, and Tx power). In order to increase the alternate route options, the modulation type, coding rate, spreading factor, and Tx power are varied in order to find routes with the smallest number of hops (or the highest quality metric) to the destination while still maintaining the desired QoS of 1 Mbps. Again, as each route is found, a route table entry is created toward the destination that is indexed by a combination of the destination address and the transmission variables (i.e. frequency band, modulation type, coding rate, spreading factor, and Tx power). The route that uses the highest Tx Power, lowest modulation type, lowest coding rate, and highest spreading factor at 1 Mbps will offer the best range to the next hop toward the destination. Alternatively, the search for alternate routes could start search for next hop nodes toward the destination offering the best range and working back toward the route with the highest data rate and lowest range to the next hop. In the end, the route table will contain alternate routes within the 5.2 GHz band that can be selected to meet or exceed the QoS objectives of the communication session which includes reducing the delays or latency by using lesser hops toward the destination. Specifically, when the interference level increases and it is necessary to find an alternate route to the destination, each node will know how to set the modulation type, coding rate, spreading factor, and Tx power when switching to the alternate route on the new frequency band, and the routing algorithm will be able to select the route with the least number of hops.

Various conditions may trigger the need to switch frequency bands. These could include conditions such as interference or congestion, but could also include a desire to segregate certain traffic types (e.g. best effort or real time data) onto their own frequency band.

The present invention further provides the ability to accommodate a plurality of QoS objectives. In an alternate embodiment, other QoS objectives may be prioritized in addition to data rate and latency, such as power utilization, and cost. The prioritization of these objectives may be dynamically altered by the device as required by the device, user, or user applications. As an example, if the battery level of the device drops below a pre-specified threshold, power utilization may be prioritized over QoS by the device, prompting a switch to an alternate route. As the Ad Hoc environments and networks are constantly changing, the route discovery and route maintenance procedures are constantly employed by the device to detect such changes and correspondingly update the route table. This provides the device with a real-time view of the communications environment. In addition to satisfying a primary QoS objective of data rate and latency, this invention may also switch routes to satisfy secondary and tertiary objectives, such as power utilization, and cost. Therefore, if a route currently is being used that satisfies the QoS objective of 1 Mbps, but does not satisfy the secondary objective of 15 dBm transmit power, another route may be selected to satisfy the secondary objective.

This method can be applied to both proactive routing and reactive routing protocols. In a proactive routing protocol such as link state routing (Open Shortest Path First (OSPF) or Optimized Link State Routing (OLSR)), each node can propagate its available transmission variables as a link state/route metric so that the route can be constructed proactively. In the reactive routing protocol such as Ad hoc On Demand Distance Vector protocol (AODV)), the capability to process multiple route requests should be enabled, or alternatively, multiple probes should be transmitted (broadcast or unicast) to detect the condition of each route in the network. In a reactive routing protocol such as Dynamic Source Routing (DSR), all the route conditions can be easily carried in each Routing Request (RREQ)/Routing Reply (RREP) because of its source routing feature to build multiple routes over different radios, and DSR does not limit the number of route requests being processed by each node as long as they are from a different path.

The present invention as herein described provides a method of performing route discovery over multiple disparate frequency bands while adjusting transmission variables to account for the differences in the propagation characteristics between frequency bands. The method enables each node operating on a first frequency band to know how to set the modulation type, coding rate, spreading factor, and Tx power when switching to the alternate route on a second frequency band, and the routing algorithm will be able to select the route with the least number of hops.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operation of a node for multi-band communication routing within a wireless communication system, the method comprising:
   communicating a communication session on a default route within an identified quality of service objective on a first frequency band;
   broadcasting, on a second frequency band, one or more route discovery messages at each of a plurality of sets of transmission variables;
   storing one or more alternate route table entries in a route table, wherein each of the one or more alternate route table entries are indexed by each of the plurality of sets of transmission variables that are at least within the quality of service objective;
   selecting a stored alternate route that is at least within the quality of service objective of the communication session on the second frequency band; and
   switching the communication session to operate using the transmission variables related to the selected alternate route.

2. A method for multi-band communication routing as claimed in claim 1, further comprising prior to communicating on the default route: performing a route discovery procedure with prioritized quality of service objectives on a first frequency band to select the default route.

3. A method for multi-band communication routing as claimed in claim 2, wherein the default route is selected using a highest frequency band and a lowest power to enable the communication session to meet its quality of service objectives in terms of data rate and latency.

4. A method for multi-band communication routing as claimed in claim 1, further comprising prior to the broadcasting step:
   switching a route discovery transceiver to a second frequency band.

5. A method for multi-band communication routing as claimed in claim 1, wherein the one or more alternate route table entries indexed by each of the plurality of sets of transmission variables are at least within the quality of service objective with a safety margin.

6. A method for multi-band communication routing as claimed in claim 1, wherein the wireless communication system comprises a mobile ad hoc cognitive network, and further wherein the node comprises a cognitive radio.

7. A method for multi-band communication routing as claimed in claim 1, further comprising prior to the broadcasting step:
   triggering a switch from the first frequency band to the second frequency band by a condition comprising one or more of a poor channel condition, an interference, a congestion, and a requirement to segregate certain traffic types onto a separate frequency band.

8. A method for multi-band communication routing as claimed in claim 1, further comprising:
   mapping the default route to a next node in the first frequency band to one or more alternate routes using one or more alternate frequency bands; and
   storing the mapping in the route table.

9. A method for multi-band communication routing as claimed in claim 1, wherein each of the sets of transmission variables comprise one or more of a modulation type, a coding rate, a spreading factor, and a transmit power.

10. A method for multi-band communication routing as claimed in claim 1, wherein the quality of service objectives comprises one or more of a data rate, a latency, a power utilization, and a cost.

11. A method for multi-band communication routing as claimed in claim 1, wherein the storing of each alternate route table entry comprises:
   creating a route table entry toward a destination that is indexed by a combination of a destination address and the transmission variables that enable the quality of service objectives to be met.

* * * * *

UNITED STATES PATENT AND TRADEMARK OFFICE
CERTIFICATE OF CORRECTION

| | |
|---|---|
| PATENT NO. | : 8,208,373 B2 |
| APPLICATION NO. | : 12/183744 |
| DATED | : June 26, 2012 |
| INVENTOR(S) | : Bonta et al. |

It is certified that error appears in the above-identified patent and that said Letters Patent is hereby corrected as shown below:

IN THE DRAWINGS:

In Fig. 4, Sheet 4 of 6, for Tag "415", in Line 2, delete "TRANSMISSIONS" and insert -- TRANSMISSION --, therefor.

In Fig. 5, Sheet 5 of 6, for Tag "514", in Line 3, delete "DEGREDATION" and insert -- DEGRADATION --, therefor.

Signed and Sealed this
Fifteenth Day of January, 2013

David J. Kappos
*Director of the United States Patent and Trademark Office*